(12) United States Patent
Miyashita et al.

(10) Patent No.: US 7,554,238 B2
(45) Date of Patent: Jun. 30, 2009

(54) MULTI-WINDING MOTOR WITH REDUCED IMPEDANCE UNBALANCE

(75) Inventors: Toshihito Miyashita, Tokyo (JP); Shintarou Koichi, Tokyo (JP); Kazuyoshi Murata, Tokyo (JP); Masanori Sakai, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 586 days.

(21) Appl. No.: 11/278,025

(22) Filed: Mar. 30, 2006

(65) Prior Publication Data

US 2006/0220486 A1 Oct. 5, 2006

(30) Foreign Application Priority Data

Mar. 31, 2005 (JP) ............................. 2005-102702

(51) Int. Cl.
*H02K 1/00* (2006.01)
(52) U.S. Cl. ...................................... 310/184; 310/179
(58) Field of Classification Search ................. 310/184, 310/198, 179–180, 218, 259; 29/596, 606
See application file for complete search history.

(56) References Cited

U.S. PATENT DOCUMENTS

| | | | | |
|---|---|---|---|---|
| 5,128,570 A | * | 7/1992 | Isozaki | 310/49 R |
| 5,747,910 A | * | 5/1998 | Haner | 310/180 |
| 6,326,713 B1 | * | 12/2001 | Judson | 310/112 |
| 6,583,530 B2 | * | 6/2003 | Hsu | 310/254 |
| 6,784,583 B2 | * | 8/2004 | Umeda | 310/179 |
| 7,091,644 B2 | * | 8/2006 | Fukushima et al. | 310/179 |

FOREIGN PATENT DOCUMENTS

| | | |
|---|---|---|
| EP | 1 244 195 | 9/2002 |
| JP | 05-146124 | 6/1993 |
| JP | 07-298685 | 11/1995 |
| JP | 2001-197696 | 7/2001 |
| JP | 2002-325476 | 11/2002 |
| JP | 2003-264952 | 9/2003 |

OTHER PUBLICATIONS

Research Report 98-13, "Dual Stator Winding Induction Machine Drive", A. Munoz-Garcia et al., Wisconsin Electric Machines & Power Electronics Consortium, university of Wisconsin-Madison, College of Engineering, 1998.

* cited by examiner

*Primary Examiner*—Michael C Zarroli
(74) *Attorney, Agent, or Firm*—Rankin, Hill & Clark LLP

(57) ABSTRACT

The present invention provides a multi-winding motor. Two three-phase exciting windings Sa, Sb are wound on each of the magnetic pole sections of divided cores 9. Two kinds of discrete winding wirings A, B are wound together with the same winding number onto each of the magnetic pole sections 13A-13L of the divided cores 9. Divided cores 9 wound with the discrete winding wirings A, B are annularly disposed, and are connected in parallel with each other so that the discrete winding wirings are arranged in the order of A, B, A, B . . . within the same connection, and the exciting windings are star-connected to construct two three-phase exciting windings Sa, Sb.

14 Claims, 9 Drawing Sheets

MULTI-WINDING MOTOR WITH REDUCED IMPEDANCE UNBALANCE

BACKGROUND OF THE INVENTION

1. Field of the Invention

The present invention relates to a multi-winding motor having N F-phase exciting windings, which are independent of each other.

2. Description of Related Art

As motors have been increasing in capacity, the driving devices for motors are also becoming larger to accommodate power elements and transformers of larger capacity and size, resulting in increased cost and leading to an impractical motor drive system.

As shown in Japanese Patent Application Laid-Open No. 1995-298685 (Patent Document 1), an attempt was made to reduce the size of the individual driving devices by connecting the driving devices (inverters or the like) separately to independent three-phase exciting windings of a multi-winding motor for synchronous driving.

Figure 13:
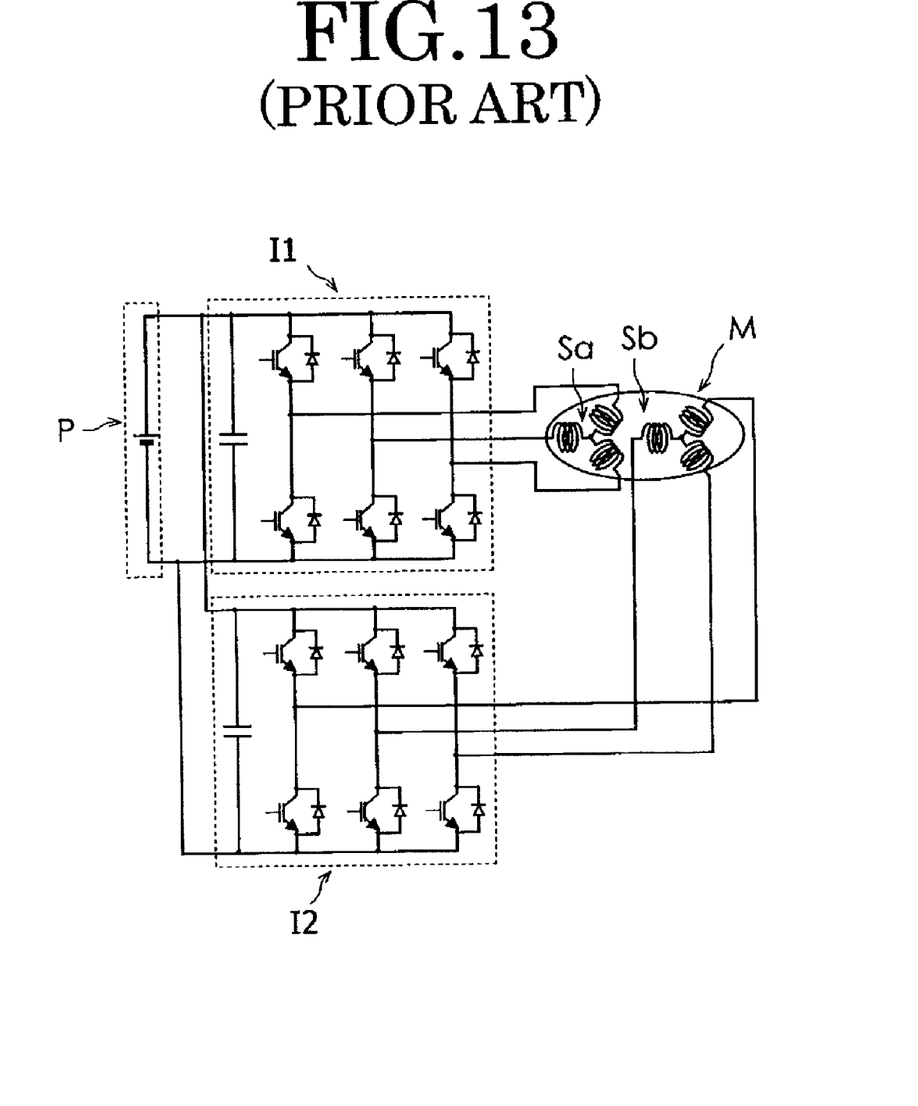
FIG. 13 illustrates a drive system of a conventional multi-winding motor.

An example of such arrangement is described below in detail with reference to FIG. 13. A multi-winding motor M has two three-phase exciting windings Sa and Sb, which are independent of each other. Separate driving devices, namely, inverters I1 and I2 are connected to the multi-winding motor M. These inverters I1 and I2 are synchronously driven to supply a drive current to the two three-phase exciting windings Sa and Sb. The inverters I1 and I2 are adapted to be supplied with power from a common DC power supply P. In the conventional multi-winding motors, however, impedance unbalance or fluctuation occurs among N F-phase exciting windings. In this specification, the wording "impedance unbalance" means that a large difference in impedance is generated among a plurality of exciting windings. When a motor is driven, a fluctuation is generated among the currents flowing through the N F-phase exciting windings, causing problems such as torque ripple, torque reduction, lowered efficiency, and deteriorated accuracy of positioning. Conventionally, in order to attain balanced current, an unbalance compensation voltage is applied to balance the current based on the error in current signals flowing through each of three phase exciting windings. However, the correction circuit has a limitation. Therefore, it is required to improve the impedance unbalance, which is the primary cause thereof.

SUMMARY OF THE INVENTION

An object of the present invention is to provide a multi-winding motor of which impedance unbalance among a plurality of F-phase windings can be improved.

Another object of the present invention is to provide a multi-winding motor of which impedance unbalance among a plurality of F-phase windings can be improved, and of which the arrangement allows for easy winding.

A multi-winding motor, of which improvement the present invention aims at, comprises a stator core (7) having F×M (F and M are integer of 2 or more) magnetic pole sections (13A-13L) and N (N is a measure of M) F-phase exciting windings (Sa, Sb) wound on F×M magnetic pole sections. F×M magnetic pole sections (13A-13L) are provided with N kinds of discrete winding wirings (A, B) distinguished depending on disposed positions at which the discrete winding wirings are disposed with respect to the magnetic pole sections respectively. In order to construct an exciting winding (U1, V1 or W1) for one phase, M discrete winding wirings are selected one by one from the N kinds of discrete winding wirings (A, B) provided at each of M magnetic pole sections [(13A, 13D, 13G, 13J); (13B, 13E, 13H, 13K) or (13C, 13F, 13I, 13L)] selected from said F×M magnetic pole sections (13A-13L), and are connected in series or in parallel with each other. N exciting windings for one phase are thus constructed. N F-phase exciting windings are constructed in such a manner that corresponding N of the exciting windings (U1 and U2, V1 and V2, W1 and W2) form an identical phase of the N F-phase exciting windings (Sa, Sb). Here, the wording "connection in series or in parallel" includes not only connections in series or in parallel but also a combination of connections in series and in parallel. For example, windings, in which two discrete winding wirings connected in series are connected in parallel, are also included.

In the multi-winding motor of the present invention, M discrete winding wirings constructing the exciting winding (U1, U2, V1, V2, W1 or W2) for one phase include M/N discrete winding wirings selected from each of the N kinds of discrete winding wirings (A, B).

When M discrete winding wirings constituting an exciting winding for one phase is constructed to include M/N discrete winding wirings selected from each of the N kinds of discrete winding wirings (A, B), by connecting the discrete winding wirings in series or in parallel with each other, the impedance unbalance among a plurality of F-phase exciting windings can be improved. Particularly, by connecting the F-phase exciting windings in series or in a combination of series and parallel connections, impedance unbalance within one phase can be improved.

In addition, when the disposed positions at which the N kinds of discrete winding wirings (A, B) are disposed with respect to the magnetic pole sections (13A-13L) are the same in respect of all of said M magnetic pole sections and N winding wires respectively constituting the N kinds of discrete winding wirings are wound on poles of the magnetic pole sections (13A-13L) and are juxtaposedly arranged in an extending direction of the poles, the impedance unbalance among the F-phase motor windings can be further improved.

Preferably, the kind of the discrete winding wiring selected from the N kinds of discrete winding wirings (A, B) wound on the M magnetic pole sections, which are regularly arranged, may be different from that of the discrete winding wiring selected from the adjacent magnetic pole sections in the regular arrangement. With this arrangement, impedance unbalance within one phase can be further improved.

Further, when the stator core is constructed from a plurality of divided cores, winding wires can easily be wound onto the magnetic pole sections.

Another multi-winding motor, of which improvement the present invention also aims at, comprises a stator core having twelve magnetic pole sections and two three-phase exciting windings wound on the twelve magnetic pole sections. The twelve magnetic pole sections are provided with two kinds of discrete winding wirings (A, B) distinguished from each other depending on disposed positions at which the discrete winding wirings are disposed with respect to the magnetic pole section. In this multi-winding motor, an exciting winding (U1, V1 or W1) for one phase is constructed from four discrete winding wirings, which are selected one by one from the two kinds of discrete winding wirings provided at each of four magnetic pole sections [(13A, 13D, 13G, 13J); (13B, 13E, 13H, 13K) or (13C, 13F, 13I, 13L)] selected from said twelve magnetic pole sections (13A-13L), and are connected in series or parallel. Thus, two exciting windings are constructed. Two three-phase exciting windings (Sa, Sb) are constructed in such a manner that corresponding two of the exciting windings for one phase (U1 and U2, V1 and V2, W1 and W2) form an identical phase of the two three-phase exciting windings.

In this multi-winding motor of the present invention, four discrete winding wirings constructing the exciting winding (U1, U2, V1, V2, W1 or W2) for one phase include two discrete winding wirings selected from each of the two kinds of discrete winding wirings (A, B). With this arrangement, since the discrete winding wirings are connected in series or in parallel with each other, the impedance unbalance among a plurality of F-phase exciting windings can be improved.

Furthermore, another multi-winding motor, of which improvement the present invention also aims at, comprises a stator core having eighteen magnetic pole sections and three three-phase exciting windings wound on the eighteen magnetic pole sections. The eighteen magnetic pole sections are provided with two kinds of discrete winding wirings distinguished from each other depending on disposed positions at which the discrete winding wirings are disposed with respect to the magnetic pole section. An exciting winding for one phase is constructed from six discrete winding wirings, which are selected one by one from the three kinds of discrete winding wirings (A, B, C) provided at each of six magnetic pole sections [(113A, 113D, 113G, 113J, 113M, 113P); (113B, 113E, 113H, 113K, 113N, 113Q) or (113C, 113F, 113I, 113L, 113O, 113R)] selected from said eighteen magnetic pole sections (113A-113R) and are connected in series or parallel. Thus, three exciting windings are constructed. Three three-phase exciting windings (Sa, Sb, SC) are constructed in such a manner that corresponding three of the exciting windings [(U1, U2, U3); (V1, V2, V3); (W1, W2, W3)] for one phase form an identical phase of the three three-phase exciting windings.

In this multi-winding motor of the present invention, six discrete winding wirings constructing said exciting winding (U1, U2, U3, V1, V2, V3, W1, W2, or W3) for one phase include two discrete winding wirings selected from each of the three kinds of discrete winding wirings (A, B, C). With this arrangement, since the discrete winding wirings are connected in series or in parallel with each other, the impedance unbalance among multi-phase exciting windings can be improved.

In the multi-winding motor of the present invention, since M discrete winding wirings constituting an exciting winding for one phase include M/N discrete winding wirings selected from each of the N kinds of discrete winding wirings, the impedance unbalance among a plurality of F-phase exciting windings can be improved.

BRIEF DESCRIPTION OF THE DRAWINGS

FIGS. 11 (A), 11(B) and 11(C) are illustrations showing how three (first-third) three-phase exciting windings Sa-Sc are connected in parallel in a multi-winding motor according to a fourth embodiment of the present invention.

FIG. 12(A), (B) and (C) are illustrations showing how three (first-third) three-phase exciting windings Sa-Sc are connected in series in a multi-winding motor according to a fifth embodiment of the present invention.

BEST MODE FOR CARRYING OUT THE INVENTION

Figure 1:
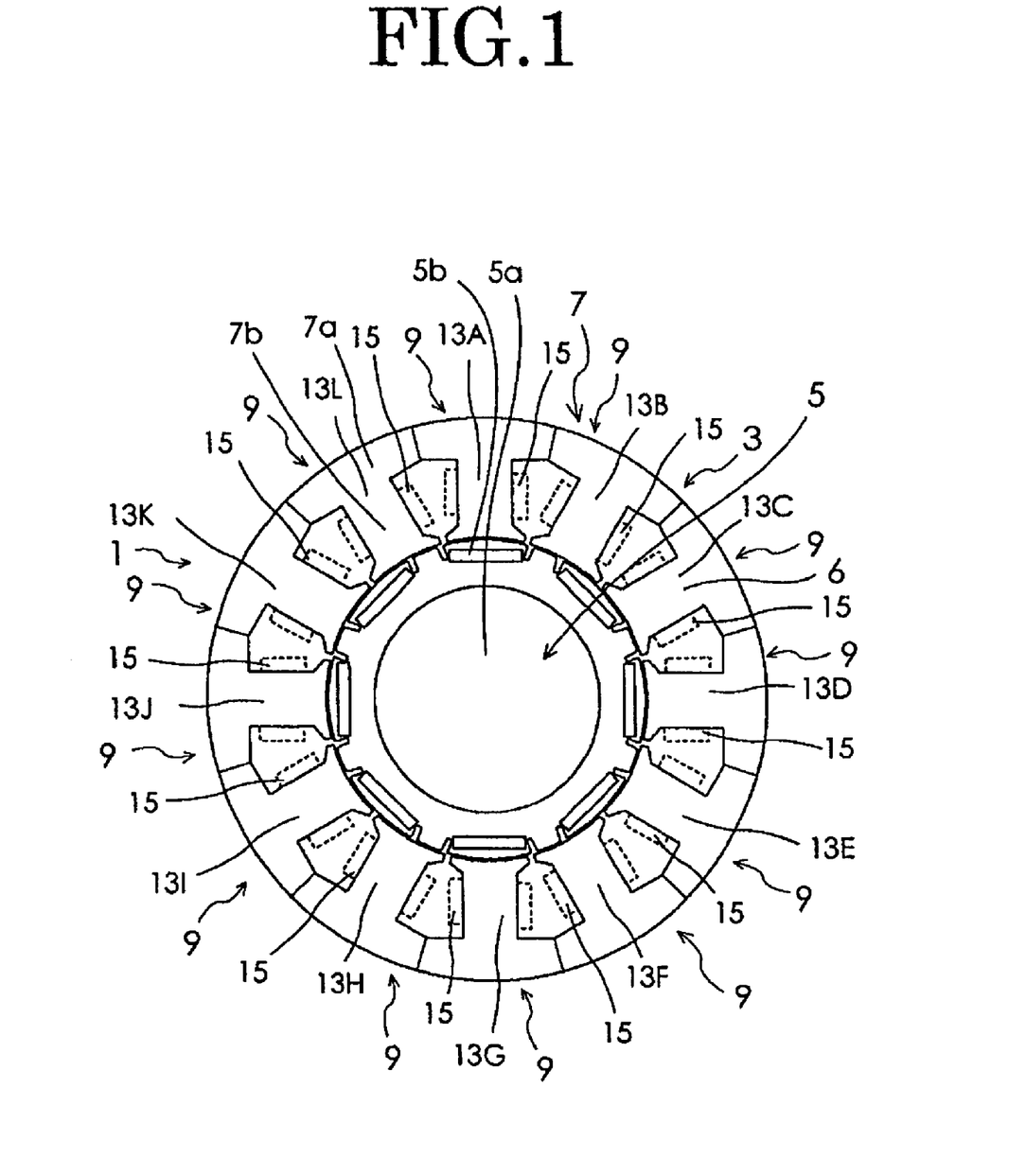
FIG. 1 is a cross sectional view of a multi-winding motor according to a first embodiment of the present invention.
Figure 2:
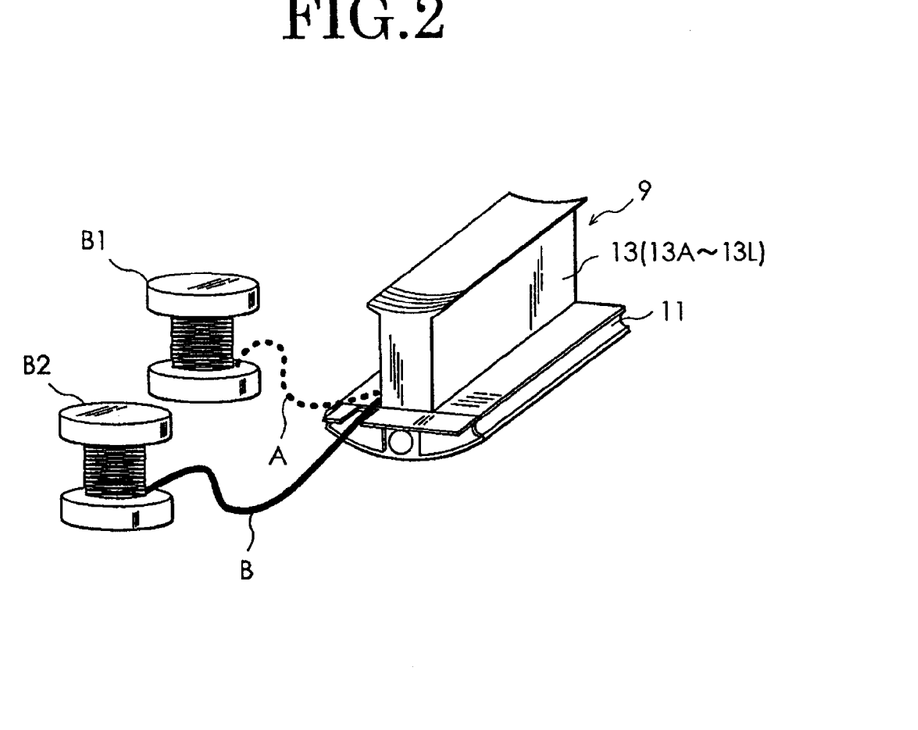
FIG. 2 illustrates how to wind discrete winding wirings A, B onto a magnetic pole section of the multi-winding motor according to the first embodiment.

Now, the best mode for carrying out the present invention will be described in detail with reference to the accompanying drawings. FIG. 1 is a cross sectional view of a multi-winding motor according to a first embodiment of the present invention. As shown in FIG. 1, a multi-winding motor 1 of the embodiment has a stator 3 and a rotor 5. The rotor 5 includes a rotor core 5a having a substantially columnar shape and eight plate-type permanent magnets 5b constituting magnetic pole sections, embedded in the vicinity of an surface portion of the rotor core 5a at regular intervals in a circumferential direction of the rotor core. The stator 3 includes a stator core 7. The stator core 7 is constructed from twelve divided cores 9 which are annularly arranged. The divided core 9 is integrally formed of a yoke constituent section 11 and a magnetic pole section 13 in a T-letter relation as shown in FIG. 2. Therefore, the stator core 7 has F×M (F and M are an integer of 2 or more) magnetic pole sections 13A-13L [in this embodiment, 12 (F=3, M=4)] (FIG. 1). Each of the twelve magnetic pole sections 13A-13L includes a winding section 15 formed of exciting windings wound thereon. In this embodiment, electric current of F phases (in this embodiment, three phases) flows through the winding sections 15 formed on the magnetic pole sections 13A-13L. The current waveforms are out phase with each other by 120 degrees in the order in which the magnetic pole sections 13A-13L are disposed in the circumferential direction. In other words, the electric current flows through the winding sections 15 formed on the magnetic pole sections 13A-13L in the order of U-phase, V-phase, W-phase, U-phase, V-phase, W-phase, . . . .

Figure 3:
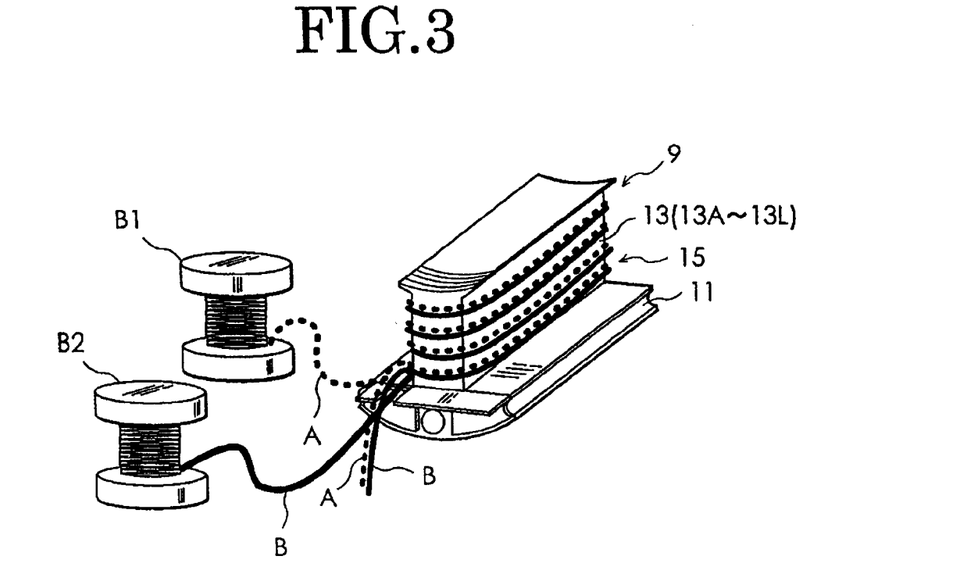
FIG. 3 illustrates how to wind the discrete winding wirings A, B onto the magnetic pole section of the multi-winding motor according to the first embodiment.
Figure 4:
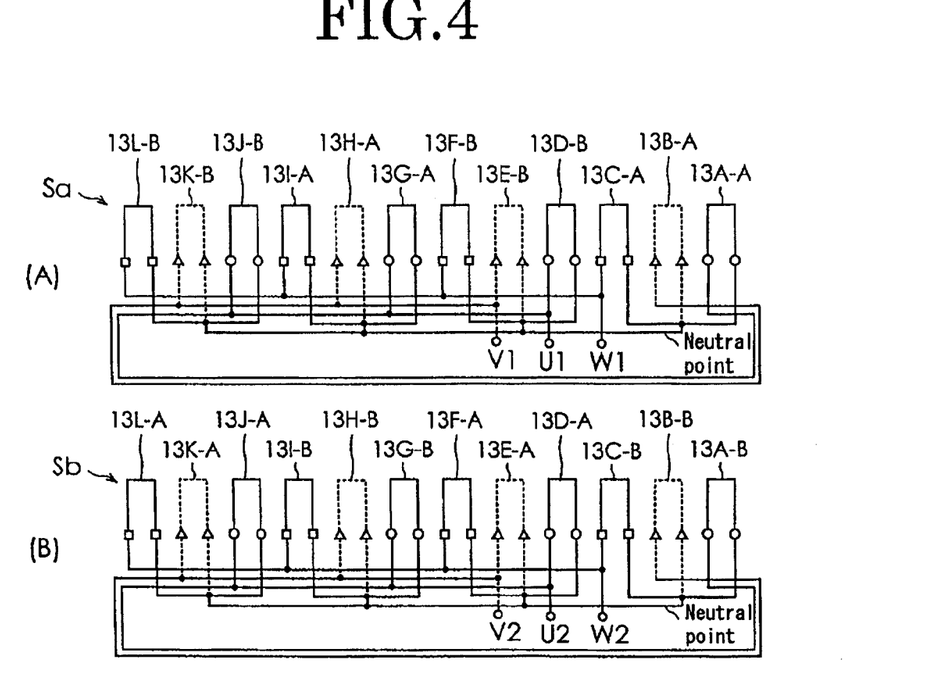
FIGS. 4(A) and 4(B) are illustrations showing how two (first and second) discrete winding wirings A, B of the three-phase exciting windings Sa, Sb are connected in the multi-winding motor according to the first embodiment.
Figure 5:
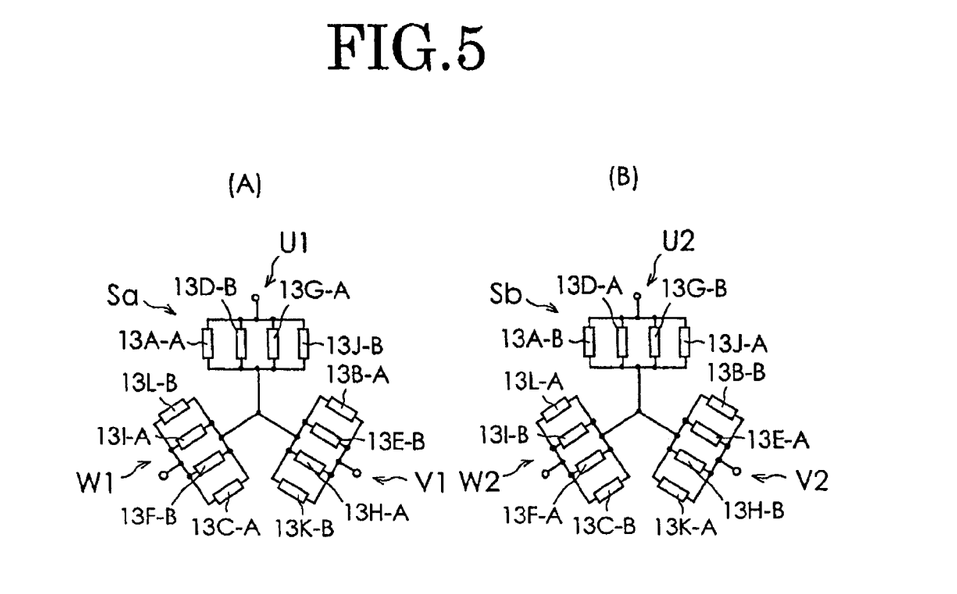
FIGS. 5(A) and 5(B) are illustrations showing how the first and second discrete winding wirings A, B of the three-phase exciting windings Sa, Sb are connected in parallel in the multi-winding motor according to the first embodiment.

As shown in FIG. 2 and FIG. 3, each of the winding sections 15 formed on the magnetic pole sections 13A-13L of the divided cores 9 is constructed from N kinds (in this embodiment, two kinds) of discrete winding wirings A, B, which are pulled from bobbins B1 and B2 and wound thereon with the same winding number. Out of the discrete winding wirings A, B pulled from the bobbins B1, B2, the discrete winding wiring B starts to be wound from a corner where the yoke constituent section 11 and the magnetic pole section 13 cross each other, and the discrete winding wiring A starts to be wound from the next thereto as shown in FIG. 2. Therefore, the disposed positions at which the two discrete winding wirings A, B are disposed with respect to the magnetic pole sections (13A-13L) are the same in respect of all of the magnetic pole sections. The two winding wires respectively constituting the two kinds of discrete winding wirings A, B are wound around the poles of the magnetic pole sections (13A-13L), being juxtaposedly arranged in an extending direction of the poles. After the two discrete winding wirings A, B are wound together, being juxtaposedly arranged, the inductances LA, LB between the discrete winding wiring A, B are resulted in LA≦LB. The twelve divided cores 9, which are wound with the discrete winding wirings A, B as described above, are annularly arranged as shown in FIG. 1. The discrete winding wirings A, B are connected to construct two three-phase exciting windings Sa, Sb as shown in FIG. 4 and FIG. 5. One (first) three-phase exciting winding Sa is constructed from an exciting winding U1, an exciting winding V1 and an exciting winding W1 which are star-connected with each other as shown in FIG. 4(A) and FIG. 5(A). In order to construct an exciting winding U1 for one phase (U-phase), four (M) discrete winding wirings A, B, A, B are connected in parallel with each other in this order, being selected one by one from the discrete winding wirings A, B provided at each of four magnetic pole sections 13A, 13D, 13G, 13J ((the magnetic pole sections wound with the discrete winding wirings A, B on the U-phase winding sections 15) selected from twelve (F×M) magnetic pole sections (13A-13L). Specifically, the exciting winding U1 is constructed from a discrete winding wiring A (13A-A) provided at the magnetic pole section 13A, a discrete winding wiring B (13D-B) provided at the magnetic pole section 13D, a discrete winding wiring A (13G-A) provided at the magnetic pole section 13G and a discrete winding wiring B (13J-B) provided at the magnetic pole section 13J, which are connected in this order in parallel with each other. Likewise, the exciting winding V1 is constructed from a discrete winding wiring A (13B-A) provided at the a magnetic pole section 13B, a discrete winding wiring B (13E-B) provided at the magnetic pole section 13E, a discrete winding wiring A (13H-A) provided at the magnetic pole section 13H and a discrete winding wiring B (13K-B) provided at the magnetic pole section 13K, which are connected in this order in parallel with each other. The exciting winding W1 is constructed from a discrete winding wiring A (13C-A) provided at the magnetic pole section 13C, a discrete winding wiring B (13F-B) provided at the magnetic pole section 13F, a discrete winding wiring A (13I-A) provided at the magnetic pole section 13I and a discrete winding wiring B (13L-B) provided at the magnetic pole section 13L, which are connected in this order in parallel with each other.

As shown in FIG. 4(B) and FIG. 5(B), the other (second) three-phase exciting winding Sb is constructed from an exciting winding U2, an exciting winding V2 and an exciting winding W2, which are star-connected with each other. The exciting winding U2 is constructed from a discrete winding wiring B (13A-B) provided at the magnetic pole section 13A, a discrete winding wiring A (13D-A) provided at the magnetic pole section 13D, a discrete winding wiring B (13G-B) provided at the magnetic pole section 13G and a discrete winding wiring A (13J-A) provided at the magnetic pole section 13J, which are connected in this order in parallel with each other. Likewise, the exciting winding V2 is constructed from a discrete winding wiring B (13B-B) provided at the magnetic pole section 13B, a discrete winding wiring A (13E-A) provided at the magnetic pole section 13E, a discrete winding wiring B (13H-B) provided at the magnetic pole section 13H and a discrete winding wiring A (13K-A) provided at the magnetic pole section 13K, which are connected in this order in parallel with each other. The exciting winding W2 is constructed from a discrete winding wiring B (13C-B) provided at the magnetic pole section 13C, a discrete winding wiring A (13F-A) provided at the magnetic pole section 13F, a discrete winding wiring B (13I-B) provided at the magnetic pole section 13I and a discrete winding wiring A (13L-A) provided at the magnetic pole section 13L, which are connected in this order in parallel with each other.

As described above, four (M) discrete winding wirings constituting the exciting winding (U1, U2, V1, V2, W1, W2) for one phase are arranged in the order of A, B, A, B. Therefore, the four (M) discrete winding wirings constituting the exciting winding (U1, U2, V1, V2, W1, W2) for one phase include two (M/N) discrete winding wirings selected from each of the two (N) kinds of discrete winding wirings A, B. The kind of he discrete winding wiring selected from two (N) kinds of discrete winding wirings A, B wound on the four (M) magnetic pole sections, which are regularly arranged, is different from that of the discrete winding wirings selected from the adjacent magnetic pole sections in the regularly arranged magnetic pole sections.

By thus constructing two three-phase exciting windings Sa, Sb so that the discrete winding wirings constituting the exciting winding (U1, U2, V1, V2, W1, W2) for one phase include two kinds of discrete winding wirings A, B, the inductance can be balanced between the two three-phase windings and among the phases.

Figure 6:
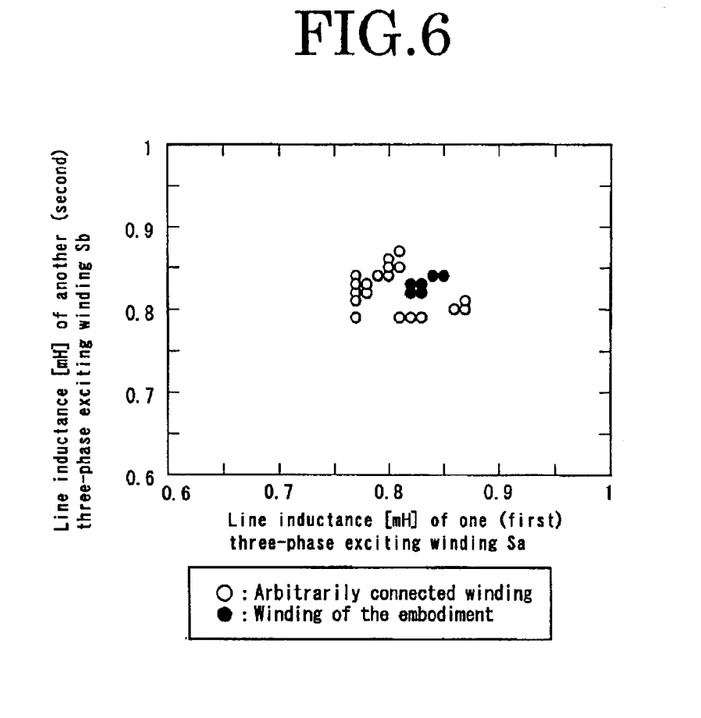
FIG. 6 shows a relationship between line inductance of one (first) three-phase exciting winding Sa and the line inductance of another (second) three-phase exciting winding Sb in a multi-winding motor used in test.

It was actually confirmed that, in the stator core 6 having an inner diameter/outer diameter of $\phi 85/\phi 205$ respectively, the difference between the inductance LA and the inductance LB was always almost 8%. FIG. 6 shows scatter plots of measured line inductances of the winding according to the embodiment of the present invention and the winding of a comparative example in which the winding is arbitrarily connected. Compared with the comparative example where the winding is arbitrarily connected, inductances between two three-phase windings and among the phases are considerably balanced in this embodiment where the winding is intentionally connected.

Figure 7:
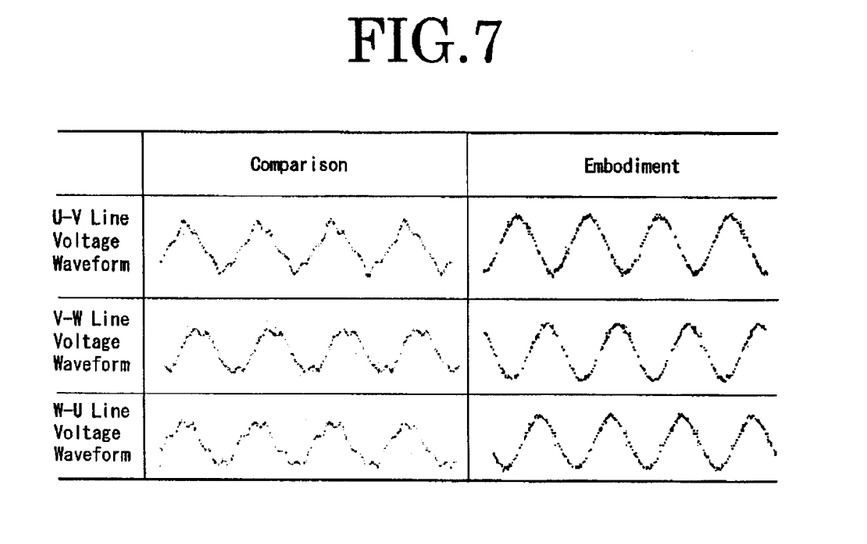
FIG. 7 is shows line voltage waveforms in multi-winding motors used in the test.

FIG. 7 shows line voltage waveforms in a motor according to a comparative example, in which the discrete winding wirings provided at the respective magnetic pole sections are constructed in the order of A, A, A, B or B, B, B, A, and the line voltage waveforms in a motor according to the embodiment of the present invention. As known from FIG. 7, the line voltage waveforms in the motor according to the embodiment are improved into sinusoidal waveforms. In particular, in the motor of the comparative example, the fluctuation among the phases in a first three-phase exciting winding Sa was 4.8%; the fluctuation among the phases in a second three-phase exciting winding Sb was 1.2%; and the fluctuation between the first three-phase exciting winding Sa and the second three-phase exciting winding Sb was 4.6%. Contrarily, in the motor of the embodiment, the fluctuation among the phases in a first three-phase exciting winding Sa was 0.49%; the fluctuation among the phases in a second three-phase exciting winding Sb was 0.91%; and the fluctuation between the first three-phase exciting winding Sa and the second three-phase exciting winding Sb was 0.34%. When the voltage waveform deflects, the current waveform deflects. In addition, the current waveforms between the three-phase exciting windings and between the phases are unbalanced or off-balanced, causing problems such as torque ripple, reduced torque, lowered efficiency, and poor controllability.

Figure 8:
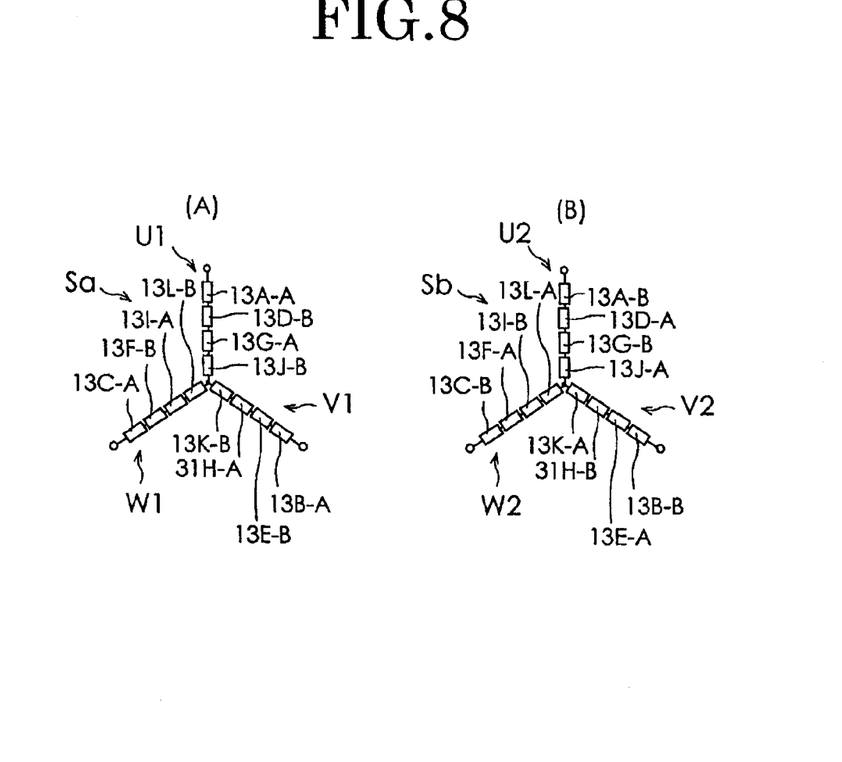
FIGS. 8(A) and 8(B) are illustrations showing how two (first and second) discrete winding wirings A, B of the three-phase exciting windings Sa, Sb are connected in series in a multi-winding motor according to a second embodiment of the present invention.

FIGS. 8(A) and (B) are illustrations showing a multi-winding motor of a second embodiment of the present invention, in which discrete winding wirings A, B are connected in series with each other. As shown in FIG. 8(A), the first three-phase exciting winding Sa of the multi-winding motor according to the embodiment is constructed from an exciting winding U1, an exciting winding V1 and an exciting winding W1, which are star-connected with each other as shown in FIG. 8(A). The exciting winding U1 for one phase (U-phase) is constructed from four (M) discrete winding wirings A, B, A, B, which are selected one by one from the two (N) kinds of discrete winding wirings A, B provided at each of the four (M) magnetic pole sections (magnetic pole sections wound with the discrete winding wirings A, B of the U-phase winding sections 15) 13A, 13D, 13G, 13J selected from twelve (F×M) magnetic pole sections 13A-13L, and are connected in that order in series with each other. Specifically, the exciting winding U1 is constructed from a discrete winding wiring A (13A-A) provided at the magnetic pole section 13A, a discrete winding wiring B (13D-B) provided at the magnetic pole section 13D, a discrete winding wiring A (13G-A) provided at the magnetic pole section 13G and a discrete winding wiring B (13J-B) provided at the magnetic pole section 13J, which are connected in this order in series with each other. Likewise, the exciting winding V1 is constructed from a discrete winding wiring A (13B-A) provided a the magnetic pole section 13B, a discrete winding wiring B (13E-B) provided at the magnetic pole section 13E, a discrete winding wiring A (13H-A) provided at the magnetic pole section 13H and discrete winding wiring B (13K-B) provided at the magnetic pole section 13K, which are connected in this order in series. The exciting winding W1 is constructed from a discrete winding wiring A (13C-A) provided at the magnetic pole section 13C, a discrete winding wiring B (13F-B) provided at a magnetic pole section 13F, a discrete winding wiring A (13I-A) provided at the magnetic pole section 13I and a discrete winding wiring B (13L-B) provided at the magnetic pole section 13L, which are connected in this order in series. The end portions, where the discrete winding wirings B of the exciting windings for the respective phases connected in series are positioned, are star-connected with each other.

As shown in FIG. 8(B), the second three-phase exciting winding Sb is constructed from an exciting winding U2, an exciting winding V2 and an exciting winding W2, which are star-connected with each other. The exciting winding U2 is constructed from a discrete winding wiring B (13A-B) provided at the magnetic pole section 13A, a discrete winding wiring A (13D-A) provided at the magnetic pole section 13D, a discrete winding wiring B (13G-B) provided at the magnetic pole section 13G, a discrete winding wiring A (13J-A) provided at the magnetic pole section 13J, which are connected in series in this order. Likewise, the exciting winding V2 is constructed from a discrete winding wiring B (13B-B) provided at the magnetic pole section 13B, a discrete winding wiring A (13E-A) provided at the magnetic pole section 13E, a discrete winding wiring B (13H-B) provided at the magnetic pole section 13H, a discrete winding wiring A (13K-A) provided at the magnetic pole section 13K, which are connected in series in this order. The exciting winding W2 is constructed from a discrete winding wiring B (13C-B) provided at the magnetic pole section 13C, a discrete winding wiring A (13F-A) provided at the magnetic pole section 13F, a discrete winding wiring B (13I-B) provided at the magnetic pole section 13I and a discrete winding wiring A (13L-A) provided at the magnetic pole section 13L, which are connected in series in this order. The end portions, where discrete winding wirings A of the exciting windings for the respective phases connected in series are positioned, are star-connected with each other.

As described above, also in this embodiment, four (M) discrete winding wirings constituting the exciting windings (U1, U2, V1, V2, W1, W2) for one phase include two (M/N) discrete winding wirings selected from each of the two (N) kinds of the discrete winding wirings A, B. By thus connecting in series as with the second embodiment, the impedance unbalance within one phase also can be improved.

Figure 9:
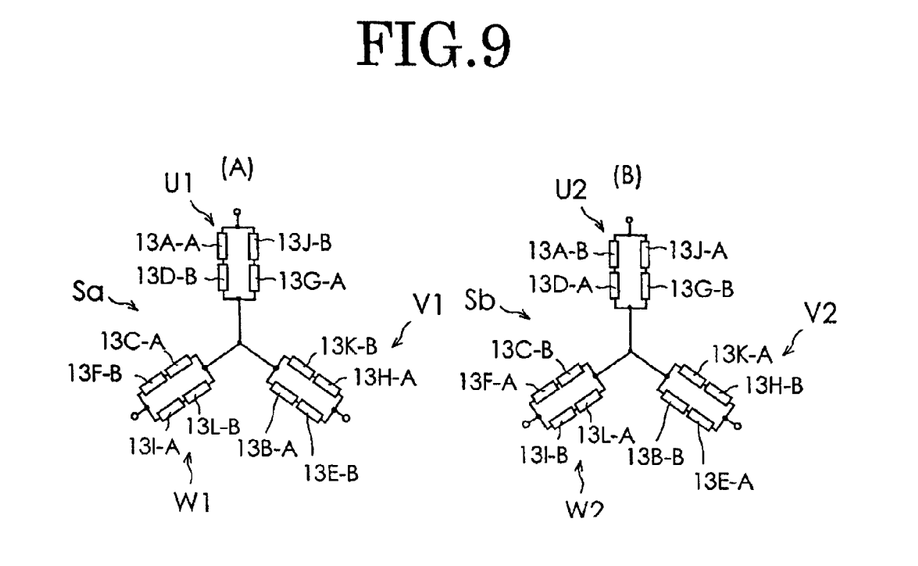
FIGS. 9(A) and 9(B) are illustrations showing how two (first and second) discrete winding wirings A, B of the three-phase exciting windings Sa, Sb are connected in a combination of series and parallel connections in a multi-winding motor according to a third embodiment of the present invention.

FIGS. 9(A) and 9(B) are illustrations showing how two (first and second) discrete winding wirings A, B of the three-phase exciting windings Sa, Sb are connected in a combination of series and parallel connections in a multi-winding motor according to a third embodiment of the present invention.

FIGS. 9(A) and (B) are illustrations showing a multi-winding motor according to a third embodiment of the present invention, in which the discrete winding wirings A, B are connected with each other in a combination of series and parallel connections. The first three-phase exciting winding Sa of the multi-winding motor according to this embodiment is constructed from an exciting winding U1, an exciting winding V1 and an exciting winding W1, which are star-connected with each other as shown in FIG. 9(A). The exciting winding U1 for one phase (U-phase) is constructed from four (M) discrete winding wirings A, B, A, B, which are selected one by one from two (N) kinds of discrete winding wirings A, B provided at each of four (M) magnetic pole section (magnetic pole sections wound with the discrete winding wirings A, B of the U-phase winding sections 15) 13A, 13D, 13G, 13J selected from twelve magnetic pole sections 13A-13L, which are connected with each other in combination of series and parallel connections. Specifically, a discrete winding wiring A (13A-A) provided at the magnetic pole section 13A and the a discrete winding wiring B (13D-B) provided at the magnetic pole section 13D are connected in series with each other; and a discrete winding wiring A (13G-A) provided at the magnetic pole section 13G and a discrete winding wiring B (13J-B) provided at the magnetic pole section 13J are connected in series with each other. And the exciting winding U1 is constructed from these wirings connected in series which are connected in parallel with each other. Likewise, in the exciting winding V1, a discrete winding wiring A (13B-A) provided at the magnetic pole section 13B and a discrete winding wiring B (13E-B) provided at the magnetic pole section 13E are connected in series with each other; a discrete winding wiring A (13H-A) provided at the magnetic pole section 13H and a discrete winding wiring B (13K-B) provided at the magnetic pole section 13K are connected in series with each other. And the exciting winding V1 is constructed from these wirings connected in series, which are connected in parallel with each other. In the exciting winding W1, a discrete winding wiring A (13C-A) provided at the magnetic pole section 13C and a discrete winding wiring B (13F-B) provided at the magnetic pole section 13F are connected in series with each other; a discrete winding wiring A (13I-A) provided at the magnetic pole section 13I and a discrete winding wiring B (13L-B) provided at the magnetic pole section 13L are connected in series with each other. And the exciting winding W1 is constructed from these wirings connected in series, which are connected in parallel with each other.

As shown in FIG. 9(B), the second three-phase exciting winding Sb of the multi-winding motor is constructed from an exciting winding U2, an exciting winding V2 and an exciting winding W2, which are star-connected with each other. In the exciting winding U2, a discrete winding wiring B (13A-B) provided at the magnetic pole section 13A and a discrete winding wiring A (13D-A) provided at the magnetic pole section 13D are connected in series with each other; a discrete winding wiring B (13G-B) provided at the magnetic pole section 13G and a discrete winding wiring A (13J-A) provided at the magnetic pole section 13J are connected in series with each other. And the exciting winding U2 is constructed from these wirings connected in series, which are connected in parallel with each other. Likewise, in the exciting winding V2, a discrete winding wiring B (13B-B) provided at the magnetic pole section 13B and a discrete winding wiring A (13E-A) provided at the magnetic pole section 13E are connected in series with each other; a discrete winding wiring B (13H-B) provided at the magnetic pole section 13H and a discrete winding wiring A (13K-A) provided at the magnetic pole section 13K are connected in series with each other. And the exciting winding V2 is constructed from these wirings connected in series, which are connected in parallel with each other. In the exciting winding W2, a discrete winding wiring B (13C-B) provided at the magnetic pole section 13C and a discrete winding wiring A (13F-A) provided at the magnetic pole section 13F are connected in series with each other; a discrete winding wiring B (13I-B) provided at the magnetic pole section 13I and a discrete winding wiring A (13L-A) provided at the magnetic pole section 13L are connected in series with each other. And the exciting winding W2 is constructed from these wirings connected in series, which are connected in parallel with each other. By thus connecting the winding wirings in combination of series and parallel connections as with the third embodiment, the impedance unbalance within one phase also can be improved.

Figure 10:
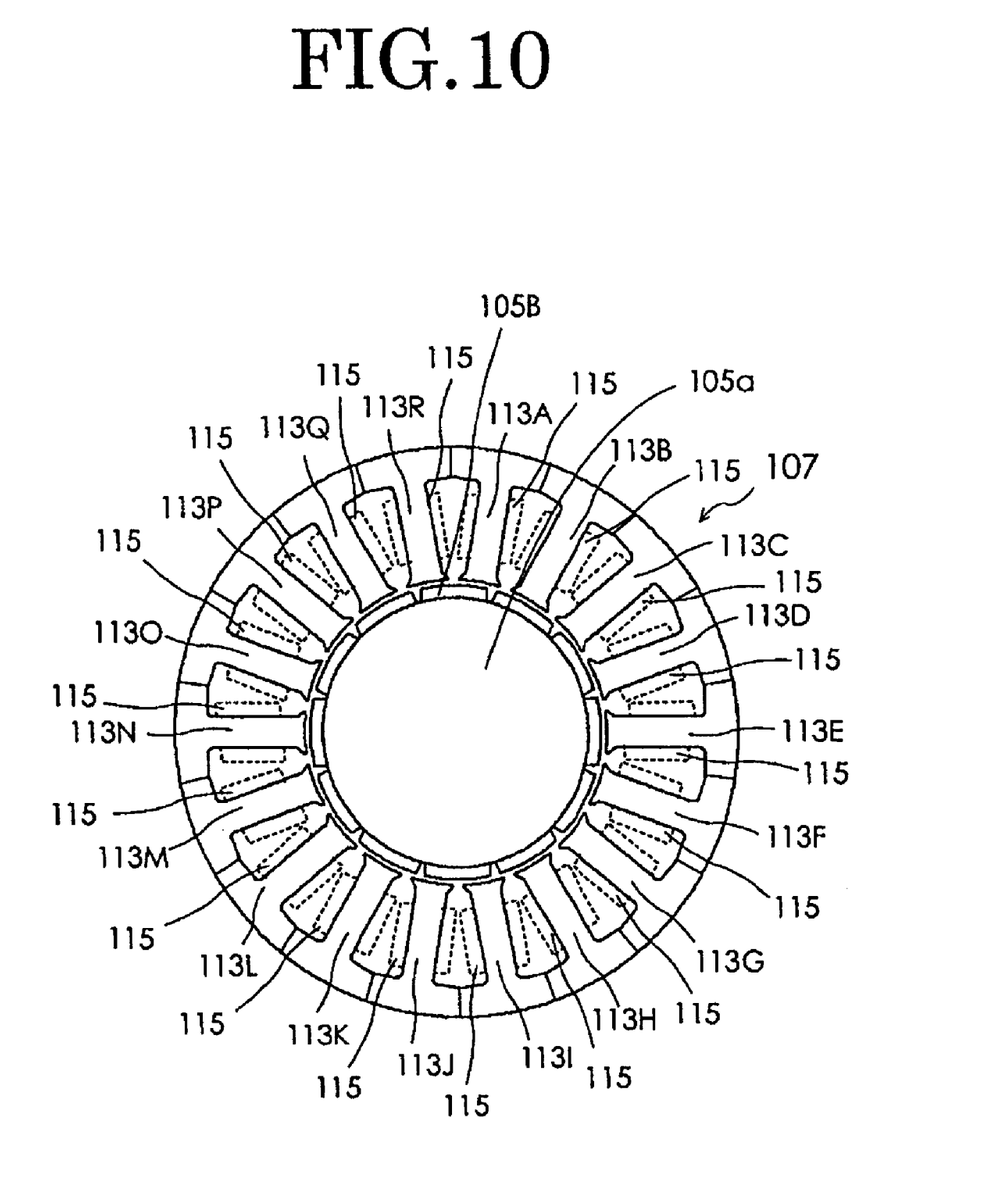
FIG. 10 is a cross sectional view of a multi-winding motor according to a fourth embodiment of the present invention.
Figure 11:
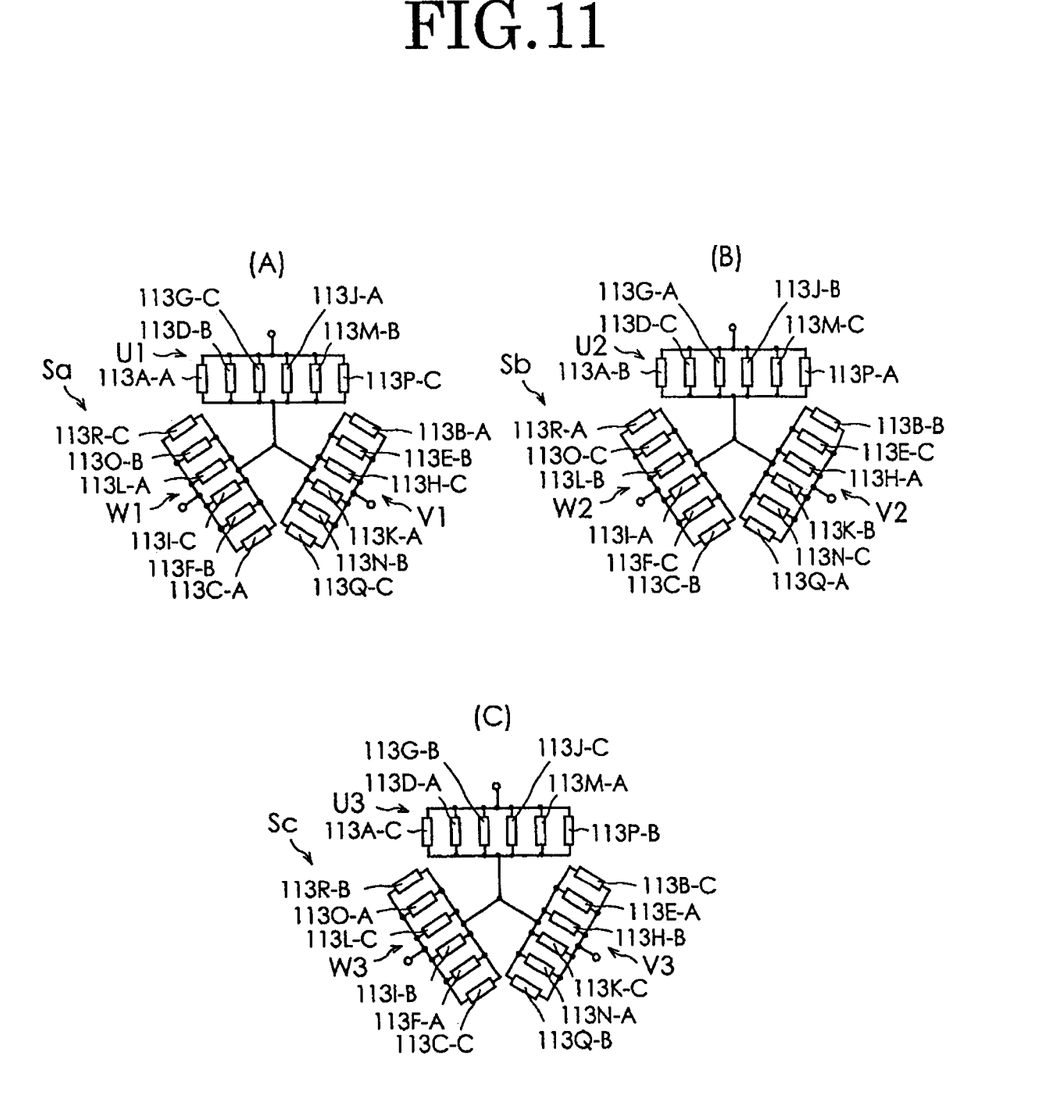

FIG. 10 is a cross sectional view of a multi-winding motor according to a fourth embodiment of the present invention. The multi-winding motor of this embodiment has twelve permanent magnetic pole sections and eighteen stator-side magnetic pole sections. The multi-winding motor comprises a stator core 107 provided with F×M (F and M are integers larger than 2) magnetic pole sections 113A-113R [as described above, in this embodiment 18 (F=3, M=6)] and winding sections 115, which comprises N (in this embodiment, three) F-phase (in this embodiment, three-phase) exciting windings Sa, Sb and Sc wound on eighteen magnetic pole sections 113A-113R. The first three-phase exciting winding Sa of the multi-winding motor of the fourth embodiment is constructed from an exciting winding U1, an exciting winding V1 and an exciting winding W1, which are star-connected as shown in FIG. 11(A). The exciting winding U1 for one phase (U-phase) is constructed from six (M) discrete winding wirings A, B, C, A, B, C, which are selected one by one from each of the three (N) kinds of discrete winding wirings A, B, C provided at each of the six (M) magnetic pole sections (magnetic pole sections wound with discrete winding wirings A, B of the U-phase winding sections 115) 113A, 113D, 113G, 113J, 113M, 113P selected from the eighteen 18 magnetic pole sections 113A-113R, which are connected in that order in parallel with each other. Specifically, the exciting winding U1 is constructed from a discrete winding wiring A (113A-A) provided at the magnetic pole section 113A, a discrete winding wiring B (113D-B) provided at the magnetic pole section 113D, a discrete winding wiring C (113G-C) provided at the magnetic pole section 113G, a discrete winding wiring A (113J-A) provided at the magnetic pole section 113J, a discrete winding wiring B (113M-B) provided at the magnetic pole section 113M and a discrete winding wiring C (113P-C) provided at the magnetic pole section 113P, which are connected in that order in parallel with each other. Likewise, the exciting winding V1 is constructed from a discrete winding wiring A (113B-A) provided at the magnetic pole section 113B, a discrete winding wiring B (113E-B) provided at the magnetic pole section 113E, a discrete winding wiring C (113H-C) provided at the magnetic pole section 113H, a discrete winding wiring A (113K-A) provided at the magnetic pole section 113K, a discrete winding wiring B (113N-B) provided at the magnetic pole section 113N and a discrete winding wiring C (113Q-C) provided at the magnetic pole section 113Q, which are connected in that order in parallel with each other. The exciting winding W1 is constructed from a discrete winding wiring A (113C-A) provided at the magnetic pole section 113C, a discrete winding wiring B (113F-B) provided at the magnetic pole section 113F, a discrete winding wiring C (113I-C) provided at the magnetic pole section 113I, a discrete winding wiring A (113L-A) provided at the magnetic pole section 113L, a discrete winding wiring B (113O-B) provided at the magnetic pole section 113O and a discrete winding wiring C (113R-C) provided at the magnetic pole section 113R, which are connected in that order in parallel with each other.

As shown in FIG. 11(B), the second three-phase exciting winding Sb is constructed from an exciting winding U2, and exciting winding V2 and an exciting winding W2, which are star-connected with each other. The exciting winding U2 is constructed from a discrete winding wiring B (113A-B) provided at the magnetic pole section 113A, a discrete winding wiring C (113D-C) provided at the magnetic pole section 113D, a discrete winding wiring A (113G-A) provided at the magnetic pole section 113G, a discrete winding wiring B (113J-B) provided at the magnetic pole section 113J, a discrete winding wiring C (113M-C) provided at the magnetic pole section 113M and a discrete winding wiring A (113P-A) provided at the magnetic pole section 113P, which are connected in that order in parallel with each other. Likewise, the exciting winding V2 is constructed from a discrete winding wiring B (113B-B) provided at the magnetic pole section 113B, a discrete winding wiring C (113E-C) provided at the magnetic pole section 113E, a discrete winding wiring A (113H-A) provided at the magnetic pole section 113H, a discrete winding wiring B (113K-B) provided at the magnetic pole section 113K, a discrete winding wiring C (113N-C) provided at the magnetic pole section 113N and a discrete winding wiring A (113Q-A) provided at the magnetic pole section 113Q, which are connected in that order in parallel with each other. The exciting winding W2 is constructed from a discrete winding wiring B (113C-B) provided at the magnetic pole section 113C, a discrete winding wiring C (113F-C) provided at the magnetic pole section 113F, a discrete winding wiring A (113I-A) provided at the magnetic pole section 113I, a discrete winding wiring B (113L-B) provided at the magnetic pole section 113L, a discrete winding wiring C (113O-C) provided at the magnetic pole section 113O and a discrete winding wiring A (113R-A) provided at the magnetic pole section 113R, which are connected in that order in parallel with each other.

As shown in FIG. 11(C), the third three-phase exciting winding Sc is constructed from an exciting winding U3, and exciting winding V3 and an exciting winding W3, which are star-connected with each other. The exciting winding U3 is constructed from a discrete winding wiring C (113A-C) provided at the magnetic pole section 113A, a discrete winding wiring A (113D-A) provided at the magnetic pole section 113D, a discrete winding wiring B (113G-B) provided at the magnetic pole section 113G, a discrete winding wiring C (113J-C) provided at the magnetic pole section 113J, a discrete winding wiring A (113M-A) provided at the magnetic pole section 113M and a discrete winding wiring B (113P-B) provided at the magnetic pole section 113P, which are connected in parallel with each other in that order. Likewise, the exciting winding V2 is constructed from a discrete winding wiring C (113B-C) provided at the magnetic pole section 113B, a discrete winding wiring A (113E-A) provided at the magnetic pole section 113E, a discrete winding wiring B (113H-B) provided at the magnetic pole section 113H, a discrete winding wiring C (113K-C) provided at the magnetic pole section 113K, a discrete winding wiring A (113N-A) provided at the magnetic pole section 113N and a discrete winding wiring B (113Q-B) provided at the magnetic pole section 113Q, which are connected in that order in parallel with each other. The exciting winding W3 is constructed from a discrete winding wiring C (113C-C) provided at the magnetic pole section 113C, a discrete winding wiring A (113F-A) provided at the magnetic pole section 113F, a discrete winding wiring B (113I-B) provided at the magnetic pole section 113I, a discrete winding wiring C (113L-C) provided at the magnetic pole section 113L, a discrete winding wiring A (113O-A) provided at the magnetic pole section 113O and a discrete winding wiring B (113R-B) provided at the magnetic pole section 113R, which are connected in that order in parallel with each other.

As described above, according to the fourth embodiment of the present invention, six (M) discrete winding wirings constituting exciting windings (U1, U2, U3, V1, V2, V3, W1, W2 and W3) for one phase include two (M/N) discrete winding wirings selected from each of the three (N) kinds of discrete winding wirings A, B, C.

Figure 12:
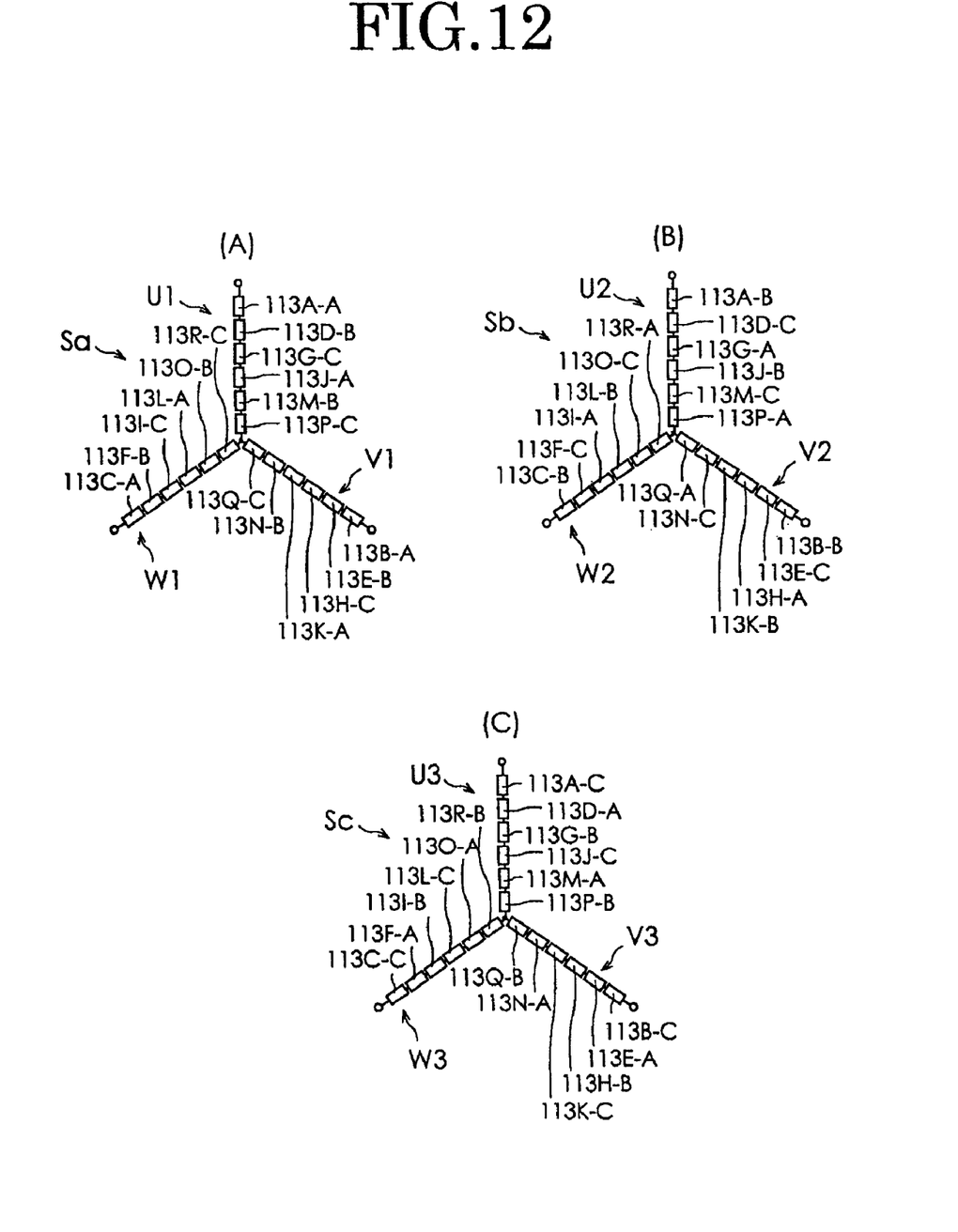

FIGS. 12(A), (B), and (C) are illustrations showing a multi-winding motor according to a fifth embodiment of the present invention, in which discrete winding wirings A, B, C are connected in series with each other. As shown in FIG. 12(A), the first three-phase exciting winding Sa of a multi-winding motor of the fifth embodiment is constructed from an exciting winding U1, an exciting winding V1 and an exciting winding W1, which are star-connected with each other. The exciting winding U1 for one phase (U-phase) is constructed from six (M) discrete winding wirings A, B, C, A, B, C, which are selected one by one from the three (N) kinds of discrete winding wirings A, B, C provided at each of six (M) magnetic pole sections 113A, 113D, 113G, 113J, 113M and 113P selected from eighteen magnetic pole sections 113A-113R, which are connected in that order in series. Specifically, the exciting winding U1 is constructed from a discrete winding wiring A (113A-A) provided at the magnetic pole section 113A, a discrete winding wiring B (113D-B) provided at the magnetic pole section 113D, a discrete winding wiring C (113G-C) provided at the magnetic pole section 113G, a discrete winding wiring A (113J-A) provided at the magnetic pole section 113J, a discrete winding wiring B (113M-B) provided at the magnetic pole section 113M and a discrete winding wiring C (113P-C) provided at the magnetic pole section 113P, which are connected in series with each other in that order. Likewise, the exciting winding V1 is constructed from a discrete winding wiring A (113B-A) provided at the magnetic pole section 113B, a discrete winding wiring B (113E-B) provided at the magnetic pole section 113E, a discrete winding wiring C (113H-C) provided at the magnetic pole section 113H, a discrete winding wiring A (113K-A) provided at the magnetic pole section 113K, a discrete winding wiring B (113N-B) provided at the magnetic pole section 113N and a discrete winding wiring C (113Q-C) provided at the magnetic pole section 113Q, which are connected in that order in series with each other. The exciting winding W1 is constructed from a discrete winding wiring A (113C-A) provided at the magnetic pole section 113C, a discrete winding wiring B (113F-B) provided at the magnetic pole section 113F, a discrete winding wiring C (113I-C) provided at the magnetic pole section 113I, a discrete winding wiring A (113L-A) provided at the magnetic pole section 113L, a discrete winding wiring B (113O-B) provided at the magnetic pole section 113O and a discrete winding wiring C (113R-C) provided at the magnetic pole section 113R, which are connected in that order in series with each other. The end portions, where the discrete winding wirings C of the exciting windings for the respective phases connected in series are positioned, are star-connected.

As shown in FIG. 12(B), the second three-phase exciting winding Sb is constructed from an exciting winding U2, an exciting winding V2 and an exciting winding W2, which are star-connected. The exciting winding U2 is constructed from a discrete winding wiring B (113A-B) provided at a magnetic pole section 113A, a discrete winding wiring C (113D-C) provided at a magnetic pole section 113D, a discrete winding wiring A (113G-A) provided at a magnetic pole section 113G, a discrete winding wiring B (113J-B) provided at a magnetic pole section 113J, a discrete winding wiring C (113M-C) provided at a magnetic pole section 113M and a discrete winding wiring A (113P-A) provided at a magnetic pole section 113P, which are connected in that order in series with each other. Likewise, the exciting winding V2 is constructed from a discrete winding wiring B (113B-B) provided at the magnetic pole section 113B, a discrete winding wiring C (113E-C) provided at the magnetic pole section 113E, a discrete winding wiring A (113H-A) provided at the magnetic pole section 113H, a discrete winding wiring B (113K-B) provided at the magnetic pole section 113K, a discrete winding wiring C (113N-C) provided at the magnetic pole section 113N and a discrete winding wiring A (113Q-A) provided at the magnetic pole section 113Q, which are connected in that order in series with each other. The exciting winding W2 is constructed from a discrete winding wiring B (113C-B) provided at the magnetic pole section 113C, a discrete winding wiring C (113F-C) provided at the magnetic pole section 113F, a discrete winding wiring A (113I-A) provided at the magnetic pole section 113I, a discrete winding wiring B (113L-B) provided at the magnetic pole section 113L, a discrete winding wiring C (113O-C) provided at the magnetic pole section 113O and a discrete winding wiring A (113R-A) provided at the magnetic pole section 113R, which are connected in that order in series with each other. The end portions, where the discrete winding wirings A of the exciting windings for the respective phases connected in series are positioned, are star-connected.

As shown in FIG. 12(C), the third three-phase exciting winding Sc is constructed from an exciting winding U3, an exciting winding V3 an exciting winding W3, which are star-connected with each other. The exciting winding U3 is constructed from a discrete winding wiring C (113A-C) provided at the magnetic pole section 113A, a discrete winding wiring A (113D-A) provided at the magnetic pole section 113D, a discrete winding wiring B (113G-B) provided at the magnetic pole section 113G, a discrete winding wiring C (113J-C) provided at the magnetic pole section 113J, a discrete winding wiring A (113M-A) provided at the magnetic pole section 113M and a discrete winding wiring B (113P-B) provided at the magnetic pole section 113P, which are connected in that order in series with each other. Likewise, the exciting winding V3 is constructed from a discrete winding wiring C (113B-C) provided at the magnetic pole section 113B, a discrete winding wiring A (113E-A) provided at the magnetic pole section 113E, a discrete winding wiring B (113H-B) provided at the magnetic pole section 113H, a discrete winding wiring C (113K-C) provided at the magnetic pole section 113K, a discrete winding wiring A (113N-A) provided at the magnetic pole section 113N and a discrete winding wiring B (113Q-B) provided at the magnetic pole section 113Q, which are connected in that order in series with each other. The exciting winding W3 is constructed from a discrete winding wiring C (113C-C) provided at the magnetic pole section 113C, a discrete winding wiring A (113F-A) provided at the magnetic pole section 113F, a discrete winding wiring B (113I-B) provided at the magnetic pole section 113I, a discrete winding wiring C (113L-C) provided at the magnetic pole section 113L, a discrete winding wiring A (113O-A) provided at the magnetic pole section 113O and a discrete winding wiring B (113R-B) provided at the magnetic pole section 113R, which are connected in that order in series with each other. And the end portions, where the discrete winding wirings B of the exciting windings for the respective phases connected in series are positioned, are star-connected with each other.

As describe above, also in this embodiment, six (M) discrete winding wirings constructing the exciting windings (U1, U2, U3, V1, V2, V3, W1, W2, W3) for one phase include two (M/N) discrete winding wirings selected from each of the three (N) kinds of discrete winding wirings A, B, C.

The above embodiments relate to a rotary type motor. However, the present invention is not limited to the above-described embodiments, but is applicable to a linear motor in the same manner as the above-described embodiments.

What is claimed is:

1. A multi-winding motor, comprising:
a stator core having F×M (F and M being an integer of 2 or more) magnetic pole sections; and
N (N being a measure of M) F-phase exciting windings wound on said F×M magnetic pole sections,
wherein said F×M magnetic pole sections are provided with N kinds of discrete winding wirings distinguished from each other depending on disposed positions at which the discrete winding wirings are disposed with respect to said magnetic pole sections;
wherein an exciting winding for one phase in one F-phase exciting winding of said N F-phase exciting windings is constructed from M of said N kinds of discrete winding wirings provided at each of the F×M magnetic pole sections, the M discrete winding wirings being selected one by one from those provided at each of M magnetic pole sections selected from said F×M magnetic pole sections; an exciting winding for one phase in another F-phase exciting winding of said N F-phase exciting windings is constructed from M of said N kinds of discrete winding wirings other than those already selected at each of the magnetic pole sections, the M discrete winding wirings being selected one by one from those not yet selected at each of M magnetic pole sections selected from said F×M magnetic pole sections; thus, N exciting windings are constructed for said M magnetic pole sections;
wherein said N F-phase exciting windings are constructed in such a manner that corresponding N of said exciting windings form an identical phase of said N F phase exciting windings; and
wherein said M discrete winding wirings constructing the exciting winding for one phase include M/N discrete winding wirings selected from each of said N kinds of discrete winding wirings.

2. The multi-winding motor according to claim 1, wherein said M discrete winding wirings are connected in series with each other.

3. The multi-winding motor according to claim 2, wherein the disposed positions at which said N kinds of discrete winding wirings are disposed with respect to said magnetic pole sections are the same in respect of all of said M magnetic pole sections; and N winding wires respectively constituting said N kinds of discrete winding wirings are wound on poles of said magnetic pole sections, being juxtaposedly arranged in an extending direction of said poles.

4. The multi-winding motor according to claim 2, wherein said M discrete winding wirings constructing said exciting winding for one phase are disposed so that the kind of said discrete winding wiring selected from said N kinds of discrete winding wirings wound on said M magnetic pole sections, which are regularly arranged, is different from that of said discrete winding wiring selected from the adjacent magnetic pole sections in the regular arrangement.

5. The multi-winding motor according to claim 2, wherein said stator core includes a plurality of divided cores, each of which is integrally constructed from a yoke constituent section and a magnetic pole section.

6. The multi-winding motor according to claim 1, wherein said M discrete winding wirings are connected in parallel with each other.

7. The multi-winding motor according to claim 6, wherein the disposed positions at which said N kinds of discrete winding wirings are disposed with respect to said magnetic pole sections are the same in respect of all of said M magnetic pole sections; and N winding wires respectively constituting said N kinds of discrete winding wirings are wound on poles of said magnetic pole sections, being juxtaposedly arranged in an extending direction of said poles.

8. The multi-winding motor according to claim 6, wherein said M discrete winding wirings constructing said exciting winding for one phase are disposed so that the kind of said discrete winding wiring selected from said N kinds of discrete winding wirings wound on said M magnetic pole sections, which are regularly arranged, is different from that of said discrete winding wiring selected from the adjacent magnetic pole sections in the regular arrangement.

9. The multi-winding motor according to claim 6, wherein said stator core includes a plurally of dMded cores, each of which is integrally constructed from a yoke constituent section and a magnetic pole section.

10. The multi-winding motor according to claim 1, wherein the disposed positions at which said N kinds of discrete winding wirings are disposed with respect to said magnetic pole sections are the same in respect of all of said M magnetic pole sections; and N winding wires respectively constituting said N kinds of discrete winding wirings are wound on poles of said magnetic pole sections, being juxtaposedly arranged in an extending direction of said poles.

11. The multi-winding motor according to claim 1, wherein said M discrete winding wirings constructing said exciting winding for one phase are disposed so that the kind of said discrete winding wiring selected from said N kinds of discrete winding wirings wound on said M magnetic pole sections, which are regularly arranged, is different from that of said discrete winding wiring selected from the adjacent magnetic pole sections in the regular arrangement.

12. The multi-winding motor according to claim 1, wherein said stator core includes a plurality of divided cores, each of which is integrally constructed from a yoke constituent section and a magnetic pole section.

13. A multi-winding motor, comprising:

a stator core having twelve magnetic pole sections; and two three-phase exciting windings wound on said twelve magnetic pole sections, wherein said twelve magnetic pole sections are provided with two kinds of discrete winding wirings distinguished from each other depending on disposed positions at which the discrete winding wirings are disposed with respect to said magnetic pole sections;

wherein an exciting winding for one phase in one three-phase exciting winding of the three-phase exciting windings is constructed from four of said discrete winding wirings provided at each of the twelve magnetic pole sections, the four discrete winding wirings being selected one by one from those provided at each of four magnetic pole sections selected from said twelve magnetic pole sections;

an exciting winding for one phase in the other F-phase exciting winding of said three-phase exciting windings is constructed from four discrete winding wirings other than those already selected, the M discrete winding wirings being respectively selected from each of the four magnetic pole sections selected from said twelve magnetic pole sections;

wherein said two three-phase exciting windings are constructed in such a manner that corresponding two of the exciting windings for one phase form an identical phase of said two three-phase exciting windings; and wherein said four discrete winding wirings constructing said exciting winding for one phase include two discrete winding wirings selected from each of said two kinds of discrete winding wirings.

14. A multi-winding motor, comprising:

a stator core having eighteen magnetic pole sections; and three three-phase exciting windings wound on said eighteen magnetic pole sections, wherein said eighteen magnetic pole sections are provided with three kinds of discrete winding wirings distinguished from each other depending on disposed positions at which the discrete winding wirings are disposed with respect to said magnetic pole sections;

wherein an exciting winding for one phase in one three-phase exciting winding of the three-phase exciting windings is constructed from six of said three kinds of discrete winding wirings provided at each of the eighteen magnetic pole sections, the six discrete winding wirings being selected one by one from those provided at each of six magnetic pole sections selected from said eighteen magnetic pole sections; an exciting winding for one phase in another three-phase exciting winding of the three-phase exciting windings is constructed from six of said three kinds of discrete winding wirings other than those already selected at each of the magnetic pole sections, the six discrete winding wirings being selected one by one from those not yet selected at each of the six magnetic pole sections; an exciting winding for one phase in the remaining three-phase exciting winding is constructed from not yet selected six discrete winding wirings provided at said six magnetic pole sections;

wherein said three three-phase exciting windings are constructed in such a manner that corresponding three of the exciting windings for one phase form an identical phase of said three three-phase exciting windings; and wherein said six discrete winding wirings constructing said exciting winding for one phase include two discrete winding wirings selected from each of said three kinds of discrete winding wirings.

* * * * *

UNITED STATES PATENT AND TRADEMARK OFFICE
CERTIFICATE OF CORRECTION

PATENT NO. : 7,554,238 B2
APPLICATION NO. : 11/278025
DATED : June 30, 2009
INVENTOR(S) : Miyashita et al.

It is certified that error appears in the above-identified patent and that said Letters Patent is hereby corrected as shown below:

Column 14, Line 45, (Claim 9, Line 2), delete "dMded" and insert --divided--.

Signed and Sealed this

Twenty-fourth Day of November, 2009

David J. Kappos
*Director of the United States Patent and Trademark Office*